July 16, 1968

L. G. SNODDY 3,392,453

PITCH INDICATOR FOR FINGER HOLES IN BOWLING BALLS

Filed May 25, 1967

Lowell G. Snoddy,
INVENTOR.

BY

C. J. Phillips

ATTORNEY.

United States Patent Office 3,392,453
Patented July 16, 1968

3,392,453
PITCH INDICATOR FOR FINGER HOLES
IN BOWLING BALLS
Lowell G. Snoddy, 419 Warner St. NW.,
Huntsville, Ala. 35805
Filed May 25, 1967, Ser. No. 641,300
4 Claims. (Cl. 33—174)

ABSTRACT OF THE DISCLOSURE

A pitch indicator for finger holes in bowling balls consisting of an elongated probe which is pivot mounted near a concave edge of an angularly calibrated plate. One end region of the probe is triangular shaped coming to a point at the extreme end and triangular shaped cams riding on the triangular surfaces of the probe end are adjustable to present a varying overall width and thus snugly engage holes of varying diameter and precisely center the probe in a hole.

Specification

This invention relates to devices for measuring the pitch of bore holes in round bodies and more particularly to a device which will measure or indicate the pitch of a finger hole of a bowling ball.

The axial direction of finger holes in bowling balls varies between balls and is determined as a matter of personal preference by the bowler. Typically a bowler will try out a number of balls and will choose one which he feels to be right for him. In order to duplicate this ball when repurchasing, it is necessary to, in some manner, measure the pitch of each hole and have the new ball drilled accordingly. While several different types of gauges for this purpose have been devised, including those illustrated by Ackerman Patent 2,706,338, Watson Patent 2,714,256, and Bernard Patent 3,206,338, for various reasons none of these suggested gauges have gained popularity.

It is the object of the present invention to provide an improved bowling ball pitch indicator which is of rugged construction, of simple manufacture and accurate use.

In accordance with the invention a pitch indicator is constructed of an elongated probe mounted on a plate having a concave edge corresponding to the curvature of a bowling ball. The elongated probe is pivoted near the concave edge and provides on one end, an end adapted to be placed into the hole of a bowling ball, particular means for centering the probe in the hole of the ball. This means consists of a pair of triangular cams mounted on a pointed end of the probe. This end is also triangular with the sides increased evenly in width rearward from the point or vortex of the triangular end. Means are provided for moving the cams back and forth in the direction of the elongated probe wherein the cams are moved outward to expand the width of the end of the probe as the cams are moved away from the point of the probe and move inward to contact the width of the probe as the cams are moved toward the end of the probe. The cams are supported or maintained against the probe by virtue of supporting means consisting of for example, a spring or springs interconnecting the cams.

These and other objects, features, and advantages of the invention will become more apparent from the following description when considered together with the drawings in which.

Figure 1:
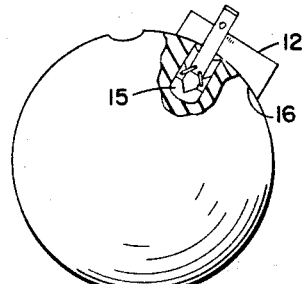
FIG. 1 is a view of a bowling ball showing the device of this invention in use.

Referring now to the drawings, an elongated probe 10 is pivotedly mounted to supporting plate 12 by means of bolt or rivet 14 to permit probe 10 to be introduced into the hole 15 of a bowling ball with the concave edge 16 of plate 12 firmly positioned against the ball. The measurement end 18 of probe 10 is of triangular configuration having opposite sides 20 and 22 which become wider apart evenly with distance from the end 18 of probe 10. Cams 24 and 26 provide a complementary angle to that of sides 20 and 22 by means of grooves 28 which slant with respect to outer surfaces 30 and 32 of cams 24 and 26 which maintain a parallel relationship as the cams engage and slide upon sides 20 and 22 of probe 10. They are held into position by spring clips 34 and 36 interconnecting cams 24 and 26. Cams 24 and 26 thus are operated to effectively narrow or widen the width of probe 10 by means of links 38, 40, 42, and 44 (not shown) interconnecting cams 24 and 26, respectively, to cam operating arm 46. The links are pivotedly coupled between the cams and arm 46 by virtue of connecting pins 48, 50, 52, and 54. Pins 48 and 50 pass through slots 58 and 60 in probe 10 to permit arm 46 to be moved along and with respect to probe 10 to which it is slidably connected by virtue of pin 62 holding arm 46 to probe 10 but permitting motion along probe 10 by virtue of slot 64.

Figure 3:
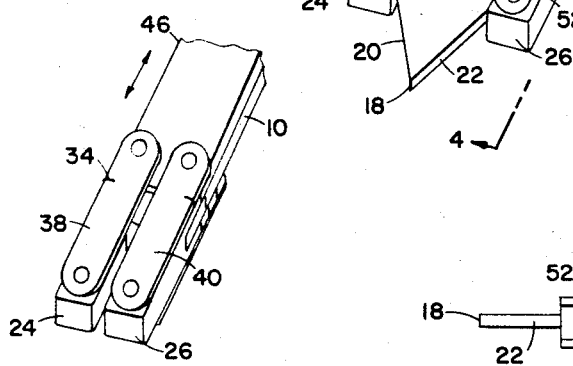
FIG. 3 is a view of a portion of the device shown in FIG. 2 adjusted for minimum probe width.
Figure 4:
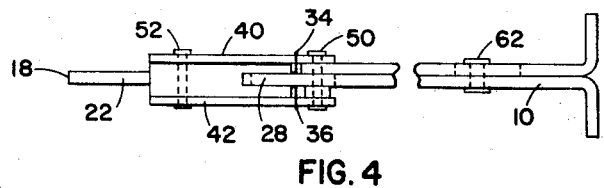
FIG. 4 is a side view of FIG. 2 along the lines 4—4.

In use, initially arm 46 would be in the position indicated in FIG. 3 with cams 24 and 26 in their minimum width position. The indicator would then be positioned over a ball and probe 10 inserted into a hole to be measured in pitch as shown in FIG. 1. With concave surface 16 of plate 12 snugly held against the ball, arm 46 is moved outward until cams 24 and 26 expand to form a snug fit with the interior of the hole. This causes probe 10 to be oriented in precise axial alignment with the hole. Then the actual measurement of the pitch of the hole is read off on a scale on plate 12 which is calibrated in fractions of inches by which the axis of the hole departs from alignment with the center of the ball at a predetermined distance from pivot 14.

Figure 2:
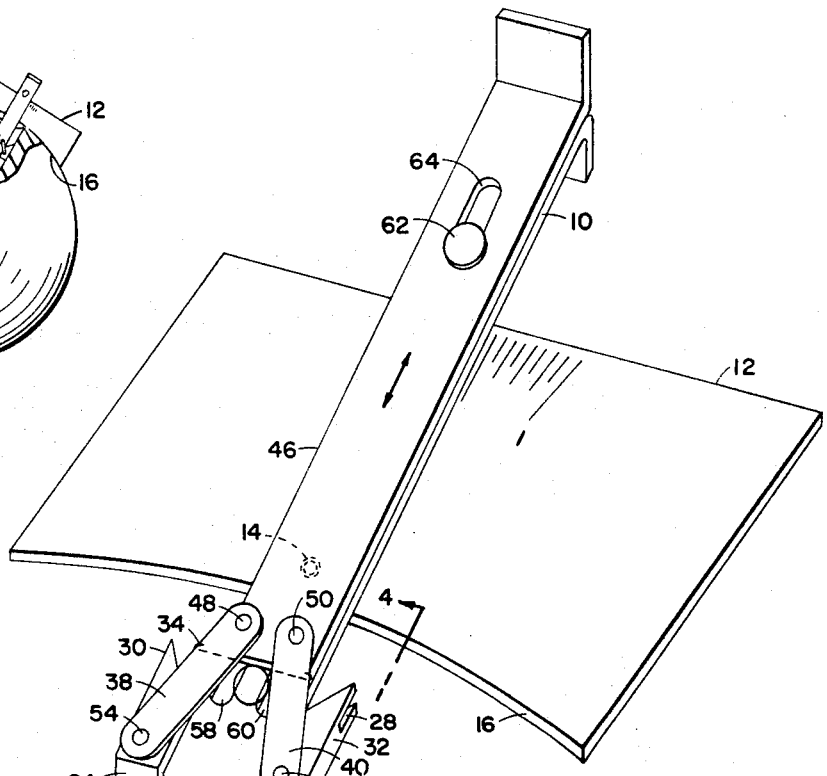
FIG. 2 is a persepective view of a device constructed in accordance with this invention.
Figure 5:
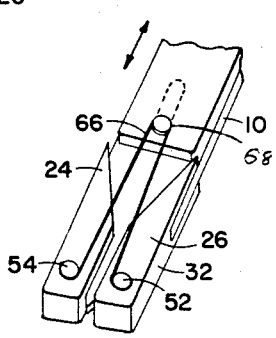
FIG. 5 is a perspective view of a portion of the device shown in FIG. 2 with some differences in structure.

FIG. 5 shows a probe similar to the one in FIG. 2. It differs in that cams 24 and 26 are maintained in aligned engagement with the end portion of probe 10 by means of a pair of U-shaped spring members 66, only the top one of which is shown. The ends of spring members 66 are connected to ends 52 and 54 and the centers of the spring members are connected to pin 68, attached to a central end portion of cam operating arm 46. Spring members 66 are constructed of steel or of a resilient plastic material, a resin systems material, and replace springs 34 and 36 and links 38, 40, 42, and 44 of the probe shown in FIG. 2.

I claim:
1. A pitch indicator for a finger hole in a bowling ball comprising
  (A) an elongated probe having a flat triangular portion at one end with a vertex angle at the extreme end and having two opposite sides increasing evenly in width rearward from said vertex angle;
  (B) first and second cams positioned to engage, respectively, said opposite sides of the triangular portion of said probe, an engaging inner surface together with an outside surface of each cam forming an angle equal to one half said vertex angle whereby said outside surfaces of said cams are maintained parallel but of increased spacing as said cams are moved in unison rearward in engagement with said sides of said probe and of decreased spacing as said cams are moved in unison forward in engagement with said sides of said probe;
(C) tension means for supporting said cams in engagement with said opposite sides of said triangular portion of said probe;
(D) cam operating means pivotably coupled to said cams and being positioned to move along and with respect to said elongated probe; and
(E) a supporting and indicating plate having a concave edge of the curvature of said bowling ball, said elongated probe being pivotably mounted near said concave edge on said plate, and said plate having a scale positioned to be read with respect to the angular orientation of said elongated probe.

2. The pitch indicator set forth in claim 1 wherein said cam operating means is an elongated member slidably mounted on said elongated probe.

3. The pitch indicator set forth in claim 2 wherein said tension means comprises a first pair of links interconnecting said first cam and said cam operating means and a second pair of links interconnecting said second cam and said cam operating means and including spring means connecting said first pair of links with said second pair of links and being positioned to compress said cams in engagement with said opposite sides of said triangular portion of said probe.

4. The pitch indicator set forth in claim 2 wherein said tension means comprises at least one U-shaped spring, one end of which connects to said first cam, the other end of which connects to said second cam, and the center of which connects to said cam operating means.

References Cited

UNITED STATES PATENTS

| 2,706,338 | 4/1955 | Ackerman et al. | |
| 2,714,256 | 8/1955 | Watson. | |
| 3,162,953 | 12/1964 | Porter | 33—174 |
| 3,206,858 | 9/1965 | Bernard. | |

SAMUEL S. MATTHEWS, *Primary Examiner.*